US 6,606,379 B2

(12) United States Patent
Khadri et al.

(10) Patent No.: US 6,606,379 B2
(45) Date of Patent: Aug. 12, 2003

(54) METHODS AND SYSTEMS FOR COLLAPSING SIGNAL TRANSFER POINT (STP) INFRASTRUCTURE IN A SIGNALING NETWORK

(75) Inventors: Seetharaman Khadri, Durham, NC (US); Randal Latta Dunn, Jr., Cary, NC (US)

(73) Assignee: Tekelec, Calabasas, CA (US)

( * ) Notice: Subject to any disclaimer, the term of this patent is extended or adjusted under 35 U.S.C. 154(b) by 0 days.

(21) Appl. No.: 09/969,173

(22) Filed: Sep. 28, 2001

(65) Prior Publication Data

US 2003/0031307 A1 Feb. 13, 2003

Related U.S. Application Data

(60) Provisional application No. 60/295,322, filed on Jun. 1, 2001.

(51) Int. Cl.[7] .............................................. H04M 15/00
(52) U.S. Cl. ............................... 379/221.1; 379/112.05; 379/230
(58) Field of Search ..................... 379/221.1, 112.05, 379/115.01, 115.02, 120, 201.01, 230, 219; 370/352

(56) References Cited

U.S. PATENT DOCUMENTS

| | | | |
|---|---|---|---|
| 5,008,929 A | | 4/1991 | Olsen et al. |
| 5,481,673 A | * | 1/1996 | Michelson ............. 395/200.15 |
| 5,712,908 A | | 1/1998 | Brinkman et al. |
| 5,812,639 A | | 9/1998 | Bartholomew et al. |
| 5,930,700 A | * | 7/1999 | Pepper et al. ................ 379/211 |
| 6,002,693 A | * | 12/1999 | Hahn .......................... 370/466 |
| 6,324,183 B1 | * | 11/2001 | Miller et al. ................. 370/467 |
| 6,327,270 B1 | | 12/2001 | Christie et al. |
| 6,330,324 B1 | * | 12/2001 | Sabinson et al. ....... 379/221.08 |

OTHER PUBLICATIONS

Anonymous, "SS7 Telephony Technical Specifications," Trillium Digital Systems, Inc., www.trillium.com/products/ss7–telephony/technical, p. 1, (2001).
Anonymous, "Message Transfer Part (MTP) Level 3," Trillium Digital Systems, Inc., www.trillium.com/tech/1078028.html, p. 1–3, (2001).
Bellcore, "Signaling Transfer Point (STP) Generic Requirements," Bellcore, No. 6, pp. 164, (Mar. 1993).

* cited by examiner

Primary Examiner—William J. Deane, Jr.
(74) Attorney, Agent, or Firm—Jenkins & Wilson, P.A.

(57) ABSTRACT

A multiple point code routing node is configured to recognize multiple point codes as true point codes. The multiple point code routing node originates, terminates, and processes messages having any of its any of its true point codes. As a result, the multiple point code routing node can replace two or more signal transfer points in a conventional telecommunications network without requiring reconfiguration of other nodes in the telecommunications network. Multiple point code routing node may also recognize multiple adjacent point codes or secondary adjacent point codes of a mated multiple point code routing node. Because the multiple point code routing node can associate multiple point codes with its mate, the number of logical or physical signaling links between adjacent multiple point code routing nodes can be increased.

32 Claims, 9 Drawing Sheets

Figure 9

METHODS AND SYSTEMS FOR COLLAPSING SIGNAL TRANSFER POINT (STP) INFRASTRUCTURE IN A SIGNALING NETWORK

RELATED APPLICATIONS

This application claims the benefit of U.S. provisional patent application No. 60/295,322 filed Jun. 1, 2001, the disclosure of which is incorporated herein by reference in its entirety.

TECHNICAL FIELD

The present invention relates the message routing infrastructure of a signaling network. More particularly, the present invention relates to methods and systems for collapsing or reducing signal transfer point (STP) infrastructure requirements in a signaling network.

BACKGROUND ART

Conventional telecommunications networks include two distinct communication pathways or subnetworks—a voice network and a signaling network. These two networks function in a cooperative manner to set up and tear down calls between users. As implied by its name, the voice network handles the transmission of voice (or user data) information between users. The signaling network has a number of responsibilities, which include call setup, call teardown, and database access. In simple terms, the signaling network facilitates the dynamic linking together of a number of discrete voice-type communication circuits such that a voice-type connection is established between the calling and called party. Additionally, the signaling network provides a framework through which non-voice-related information may be transported, with this data and transport functionality being transparent to the users. This signaling technique is often referred to as out-of-band signaling, where the term "band" implies voice band. The signaling protocol most commonly employed in communication networks around the world is the signaling system 7 (SS7) protocol.

From a hardware perspective, an SS7 network includes a plurality of SS7 nodes, generically referred to as signaling points (SPs), that are interconnected using signaling links, also referred to as SS7 links. At least three types of SPs are included in an SS7 network: service switching points (SSPs), signal transfer points (STPs) and service control points (SCPs). Within an SS7 signaling network, each SP is assigned an SS7 network address, which is referred to as a point code (PC).

An SSP is normally installed in Class 4 tandem or Class 5 end offices. The SSP is capable of handling both in-band signaling and SS7 signaling. An SSP can be a customer switch, an end office, an access tandem and/or a tandem. An STP routes signaling messages. STPs are usually installed as mated pairs for reliability purposes. Finally, SCPs control access to databases, such as 800 number translation databases, 800 number carrier identification databases, credit card verification databases, etc.

Signaling links are transmission lines used to connect SPs together. Conventional signaling links are dedicated bi-directional facilities operating at 56 kbps in the U.S. and Canada and at 64 kbps when clear channel capability is deployed. Normally, every link has a mate for redundancy and enhanced network integrity. It will be appreciated that in some cases, traditional 56 kbps dedicated SS7 signaling links may be replaced by high-speed, shared-bandwidth signaling links, such as IP or ATM signaling links.

SS7 Signaling Network Architecture

Figure 1:
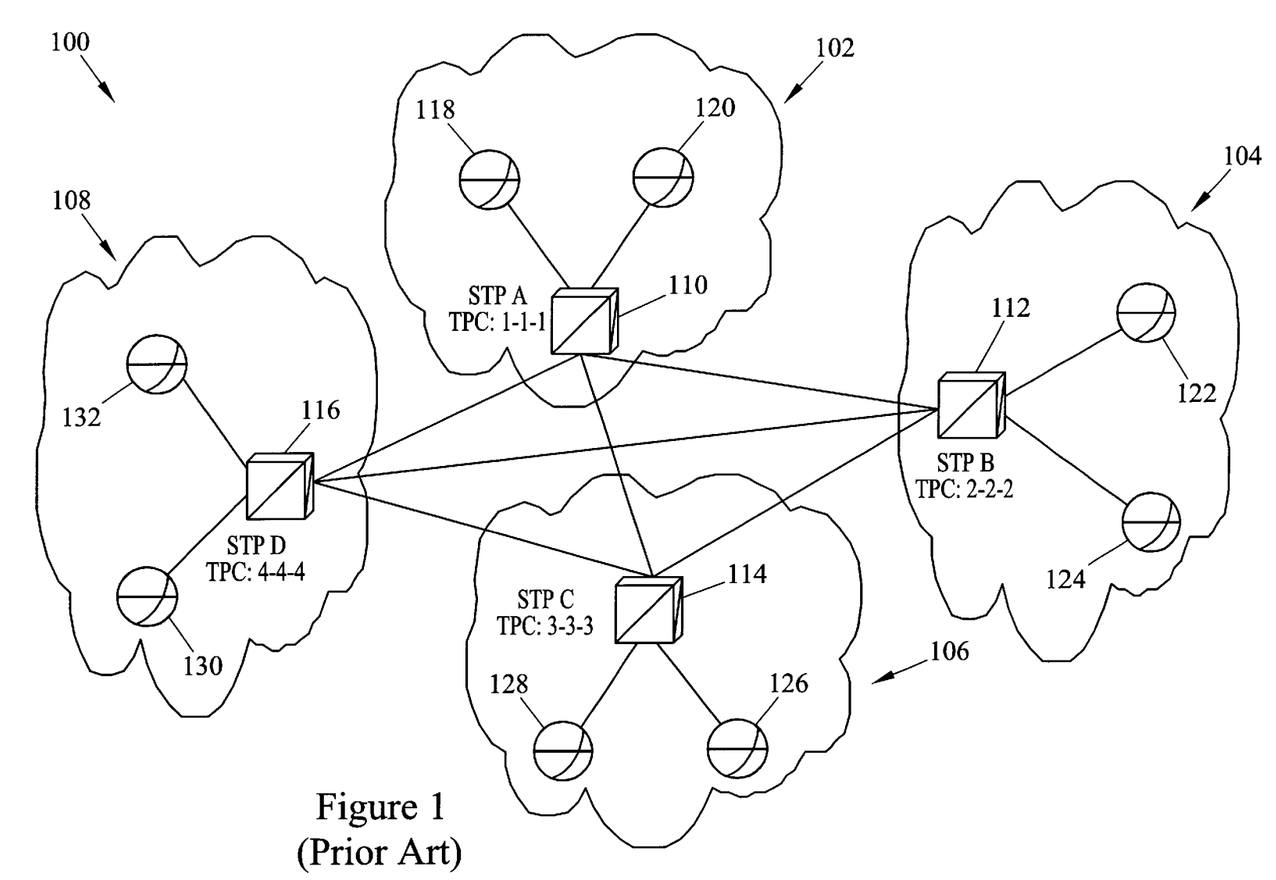
FIG. 1 is a network diagram illustrating a conventional signaling network environment including multiple signal transfer points.

FIG. 1 is a network diagram that depicts an exemplary SS7 network, generally indicated by reference numeral 100. As discussed above, STPs are typically deployed in a mated pair configuration for redundancy and reliability. However, for the purposes of illustration, only single STPs are shown in sample network 100. In FIG. 1 network 100 includes four separate networks 102, 104, 106, and 108. In the illustrated example, network 102 includes a pair of signaling points 118 and 120, network 104 includes a pair of signaling points 122 and 124, network 106 includes a pair of signaling points 126 and 128, and network 108 includes a pair of signaling points 130 and 132. STPs 110, 112, 114, and 116 perform SS7 routing for networks 102, 104, 106, and 108, respectively. As indicated in FIG. 1, STP A 110 is assigned a true point code (TPC) of 1-1-1, STP B 112 is assigned a true point code of 2-2-2, STP C 114 is assigned a true point code of 3-3-3, and STP D 116 is assigned a true point code of 4-4-4.

The term "true point code" as used herein refers to the point code that an STP recognizes as its own for network management purposes. An STP terminates messages that are addressed to its true point code. A message addressed to the TPC of a particular STP would not be "through switched" or routed by the receiving STP but would instead be terminated and processed by the STP. STPs also use a TPC when originating network management messages.

In an SS7 signaling network there are three categories of network management: traffic management, link management, and route management. Traffic management is the process of diverting messages away from failed links. Link management involves the activation and deactivation of signaling links. Route management is responsible for both re-routing messages around failed SS7 signaling points and controlling the flow of messages to any given signaling point in the network.

Those skilled in the art of SS7 signaling network operation will appreciate that such a network management strategy provides a layered approach to managing abnormal events in an SS7 network. The SS7 protocol provides procedures designed to minimize the effects of network congestion and outages from the link level all the way up to the route level. Within the SS7 message transfer part (MTP) protocol, level two of the protocol detects errors on individual signaling links.

When an error on a signaling link is detected, level two reports the error to level three, which in turn must determine the proper error resolution procedures to invoke. In general, SS7 error resolution procedures begin at the lowest level, the link level, and work their way up to the highest level, the route level. While these procedures do not have a direct impact on routing or the status of signaling points, they do, however, trigger other level-three network management events.

Traffic management is effected by link management primarily because traffic management must divert traffic away from a link that link management has failed and removed from service. In this manner, traffic management ensures the orderly delivery of all diverted traffic. When a link fails, traffic management transfers unacknowledged messages to another link buffer and subsequently retransmits these messages on a different, in-service signaling link. It should be noted that the traffic management process does not divert traffic away from a signaling point. The purpose of traffic management is simply to redirect traffic at a signaling point to a different signaling link. Traffic management does, however, impact routes and route-sets to specific destinations. If a particular route is used by another signaling point to reach a destination, and traffic management has diverted traffic away from that route, adjacent signaling points may have to invoke route management procedures.

At the highest level, route management diverts traffic away from signaling points that have become unavailable or congested. Regardless of the root cause, traffic management and link management will be involved at the affected signaling point. At the same time, all the signaling points around the affected signaling point are forced to invoke route management procedures to prevent messages from becoming lost.

Figure 2:
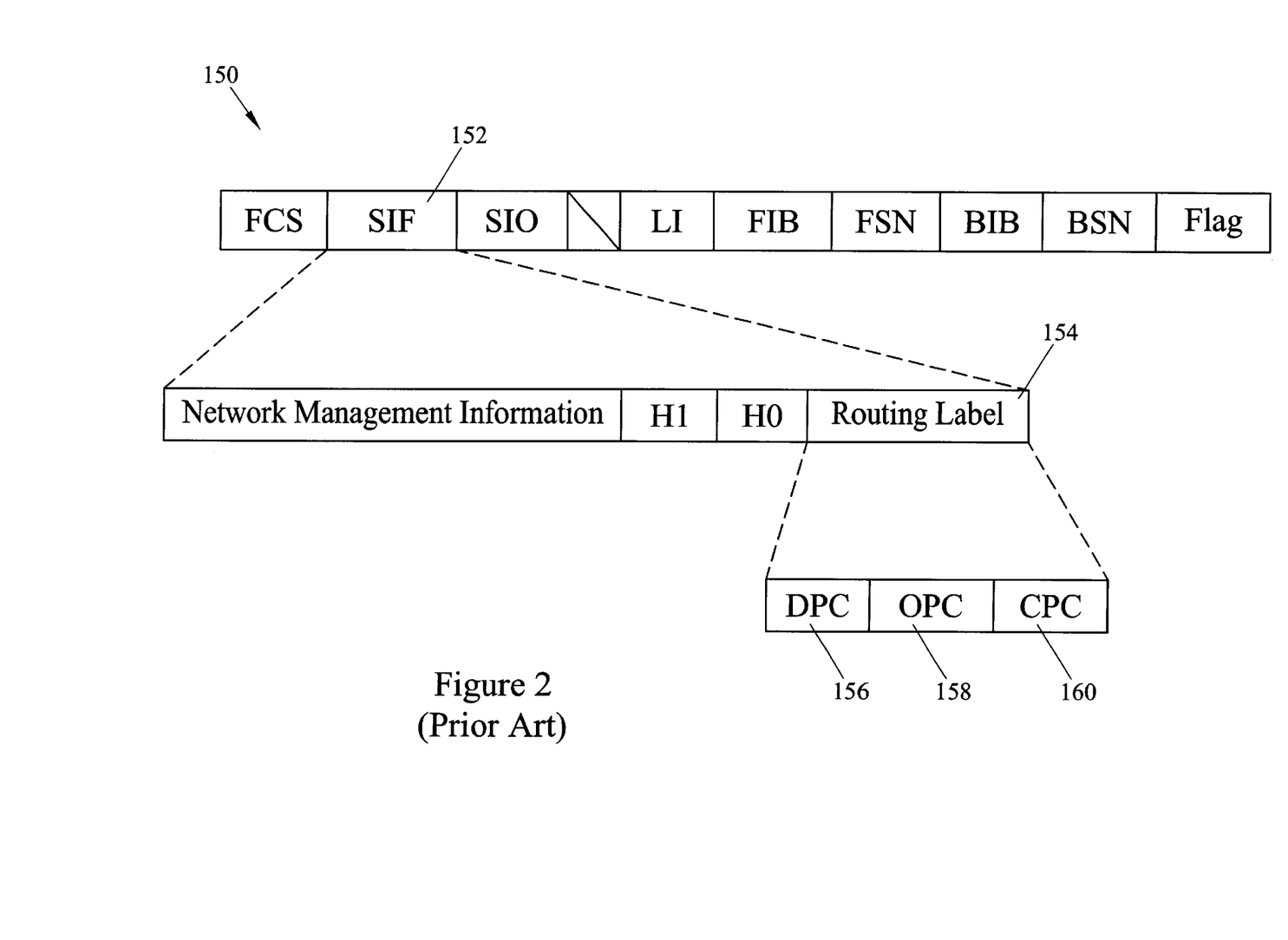
FIG. 2 is a diagram illustrating an exemplary signaling system 7 network management message structure.

In an SS7 network, the above-described network management functionality is accomplished through the use of specific network management messages. A sample structure of a typical SS7 network management message or message signaling unit (MSU) 150 is illustrated in FIG. 2. It will be appreciated by those skilled in the art of SS7 signaling communications that the signaling information field (SIF) 152 of MSU 150 includes data associated with a particular point code that is experiencing difficulty or a particular link that has failed. Additional status information, priority codes, and other relevant maintenance codes may also be included in SIF 152, depending upon the particular type of network management message being sent. A routing label field 154 may contain a number of additional fields, including a destination point code (DPC) field 156, an originating point code (OPC) field 158, and a concerned point code (CPC) field 160. Depending on the particular type of network management message, the information conveyed in these fields may enable an adjacent node to determine which other node in the network is experiencing difficulties and to which node in the network status queries should be directed. In most instances, a network management message originated by an STP in a signaling network will include an OPC value that is the true point code assigned to that STP. Other affected nodes in the network use the TPC of the STP to direct related network status queries to that STP. Because conventional STPs only have a single true point code, each STP is only capable of serving a single network. Stated differently, at least one STP per network is required for network management purposes.

There are a number of routing management messages commonly employed to re-direct traffic around a failed or congested route. Such messages may be sent by an SS7 signaling point in response to the failure of one or more provisioned links. More particularly, when a route fails, a routing management message is sent to all neighboring SS7 signaling nodes (i.e., those SS7 signaling nodes that are adjacent to the troubled signaling node). This routing management message informs the neighboring SS7 signaling nodes of the problem at the troubled node and also provides instructions regarding future routing to the troubled node. Routing management messages are also used to inform neighboring SS7 signaling nodes of the recovery of a previously troubled node. SS7 routing management messages include: transfer prohibited (TFP), transfer restricted (TFR), transfer controlled (TFC), transfer allowed (TFA) messages, transfer cluster prohibited (TCP), and transfer cluster allowed (TCA). These messages are only a subset of all network management messages defined in the SS7 protocol.

A transfer prohibited message is generated and transmitted by an SS7 signaling point (e.g., an STP) in response to determining that communication with an SS7 node is no longer possible. A transfer restricted message may be sent in response to determining that communication with an SS7 node is possible, but sub-optimal. A TFR message requests that adjacent SS7 signaling points use alternate routes when sending messages to the troubled SS7 node. If alternate routes are not available, messages may continue to be routed normally. A transfer controlled message is sent by an SS7 signaling point (e.g., an STP) in response to the receipt of an MSU destined for a congested route. In such a scenario, the MSU is discarded, and a TFC message is returned to the originator or sender of the MSU. A transfer allowed message is sent by an SS7 signaling point when a previously failed route becomes available.

Referring back to FIG. 1, each network includes a single STP. It may be desirable to reduce the number of STPs for cost, reliability, or regulatory reasons. However, as stated above, conventional STPs are only capable of performing network management using a single true point code. Thus, replacing multiple STPs with a single STP would require re-provisioning of network nodes to communicate with the new STP. Reprovisioning all nodes in a network to communicate with a new STP is undesirable because of the time and labor involved in reprogramming each individual node. Accordingly, there exists a long-felt need for methods and systems for seamlessly reducing the number of STPs in a signaling network.

DISCLOSURE OF THE INVENTION

The present invention includes a multiple point code routing node that assumes more than one true point code for SS7 routing and network management message origination and termination. STPs have conventionally had only one true point code. The present invention introduces the concept of a secondary true point code, which allows a routing node, such as an STP, to function as if it has more than one true point code. A secondary true point code is different from a conventional capability point code in that true point codes are used for network management messages; whereas capability point codes are used for SCCP messages.

According to one aspect, the present invention includes a routing node provisioned to respond to a true point code and a secondary true point code. The secondary true point code may correspond to the true point code of an STP being replaced by the routing node. Because a routing node can be provisioned to respond to both a true point code and one or more secondary true point codes, the signaling network infrastructure can be simplified without reconfiguring network elements to communicate with a new routing node having a new true point code.

According to another aspect, the present invention includes a method for originating network management messages from a multiple point code routing node. When a multiple point code routing node receives notification of a network management event, such as a signaling link failure, the multiple point code routing node originates network management messages to other networks. When formulating a network management message, the multiple point code routing node inserts its true point code or one of its secondary true point codes in the OPC field of a network management message, depending on the destination network. When sending messages to a mated routing node, the multiple point code routing node must select the correct DPC to include in the network management message. For example, if a mated routing node has two true point codes, the multiple point code routing node originating a network management message chooses between the true point codes depending on the replaced STP that would have originally received the message. Finally, the multiple point code routing node may include a concerned point code in the network management message to indicate the failed signaling link. Because the multiple point code routing node is capable of using multiple true point codes in network management messages that it originates, the network management functionality of multiple STPs can be seamlessly replaced.

In addition to the secondary point code addressing scheme discussed above, a mated pair of MPC routing nodes of the present invention may recognize multiple adjacent point codes in order to facilitate the reliable communication of signaling messages (e.g., network management messages, call setup/teardown messages, query messages, etc. ) between mates. An adjacent point code is the point code of a node at the remote end of an SS7 signaling link. For example, STPs of a mated pair may be connected by C links. In conventional SS7 networks, the adjacent point code recognized by each STP in a mated pair of STPs was set to the single true point code of its mate. Setting the adjacent point code to the true point code of a mate STP allows each STP to reroute traffic through its mate STP in the event of a signaling link failure. STPs according to the present invention can be provisioned to respond to multiple true point codes and to associate multiple adjacent point codes with their mates. Because each STP of a mated pair can associate multiple adjacent point codes with its mate, multiple C linksets can be used to interconnect the STPs. As a result, reliability of the pair is increased.

In an alternate implementation, each STP of a mated pair may be connected by one or more IP signaling links. In such an implementation, each STP may associate multiple adjacent point codes with its mate over the IP signaling link. Thus, a single IP link may function as multiple SS7 C linksets by using multiple adjacent point codes. The ability to function as multiple logical C links over an IP link provides increased reliability without the need for adding new SS7 C linksets.

The functions for providing multiple point code routing support are described herein as modules, applications, or processes. It is understood that these modules, applications, or processes may be implemented as computer-executable instructions embodied in a computer-readable medium. Alternatively, the modules, applications, or processes described herein may be implemented entirely in hardware. In yet another alternative embodiment, the modules, applications, or processes described herein may be implemented as a combination of hardware and software.

The modules, applications, and processes for providing multiple point code routing functionality are described below as being associated with cards or subsystems within an STP or signaling gateway routing node. It is understood that these cards or subsystems include hardware for storing and executing the processes and modules. For example, each card or subsystems described below may include one or more microprocessors, such as an x86 microprocessor available from Intel Corporation or a K-series microprocessor available from AMD Corporation, and associated memory.

Accordingly, it is an object of the present invention to provide a routing node that assumes the true point code identities of other signal transfer point routing nodes in one or more SS7 signaling networks.

It is another object of the present invention to provide a routing node that replaces one or more STPs by assuming their true point code identities.

It is another object of the present invention to provide a system and method of collapsing or reducing STP infrastructure requirements in a signaling network environment while minimally impacting other signaling points in the signaling network environment.

It is another object of the present invention to provide a system and method for enabling multiple SS7 signaling links and linksets to be provisioned between a mated pair of STPs.

It is yet another object of the present invention to provide a routing node for maintaining SS7 network management integrity while assuming multiple true point code identities.

It is yet another object of the present invention to provide a routing node that functions as a plurality of virtual STPs, where each virtual STP communicates with adjacent nodes using a different true point code.

It is yet another object of the present invention to provide a mated pair of routing nodes that communicate with one another using a plurality of different adjacent point codes.

It is yet another object of the invention to provide an STP capable of serving multiple networks.

Some of the objects of the invention having been stated hereinabove, other objects will become evident as the description proceeds, when taken in connection with the accompanying drawings as best described hereinbelow.

DETAILED DESCRIPTION OF THE INVENTION

Figure 3:
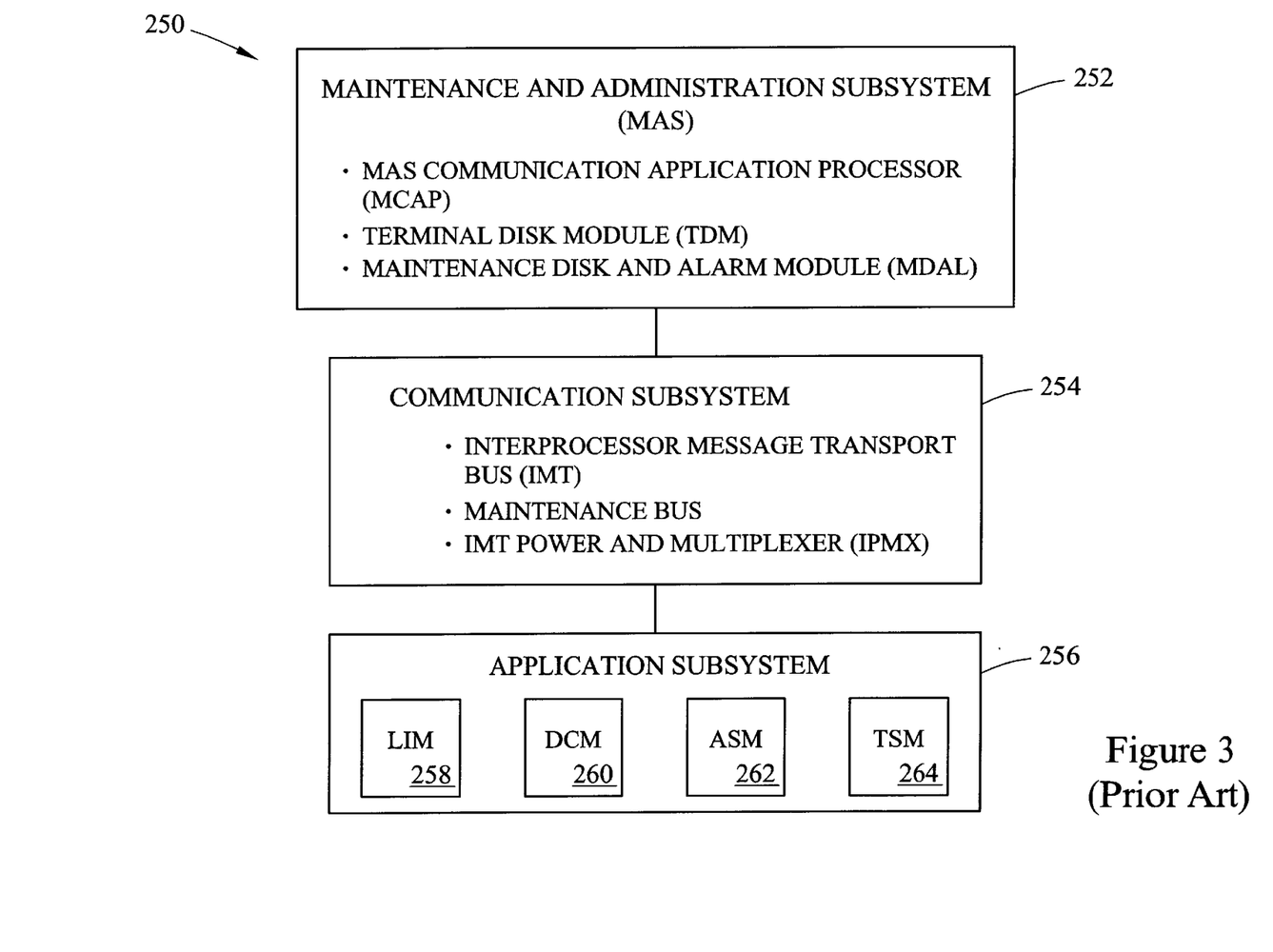
FIG. 3 is a block diagram of an SS7 routing node architecture suitable for use with embodiments of the present invention.

Embodiments of the present invention may include an underlying hardware platform similar to a signaling system 7 signal transfer point or signaling gateway (SG) routing node. Exemplary STP or SG hardware platforms suitable for use with embodiments of the present invention include the EAGLE® STP and the IP7™ Secure Gateway, both available from Tekelec of Calabasas, Calif. A block diagram that generally illustrates the base internal architecture of the IP[7]™ Secure Gateway is shown in FIG. 3. In FIG. 3, an IP[7]™ Secure Gateway 250 includes the following subsystems: a maintenance and administration subsystem (MAS) 252; a communication subsystem 254 and an application subsystem 256. MAS 252 provides maintenance communications, initial program load, peripheral services, alarm processing and system disks. Communication subsystem 254 includes an interprocessor message transport (IMT) bus that is the main communication bus among all subsystems in IP[7]™ Secure Gateway 250. The IMT bus includes two 125 Mbps counter-rotating serial rings.

Application subsystem 256 includes application cards (printed circuit boards) capable of communicating with the other cards through the IMT bus. Numerous types of application cards can be incorporated into SG 250, including: a link interface module (LIM) 258 that interfaces with SS7 links and X.25 links; a data communication module (DOM) 260 that provides an Internet protocol interface using transmission control protocol (TOP); and an application service module (ASM) 262 that provides global title translation, gateway screening and other services. A translation service module (TSM) 264 may also be provided to support triggered local number portability service.

Network Architecture

Figure 4:
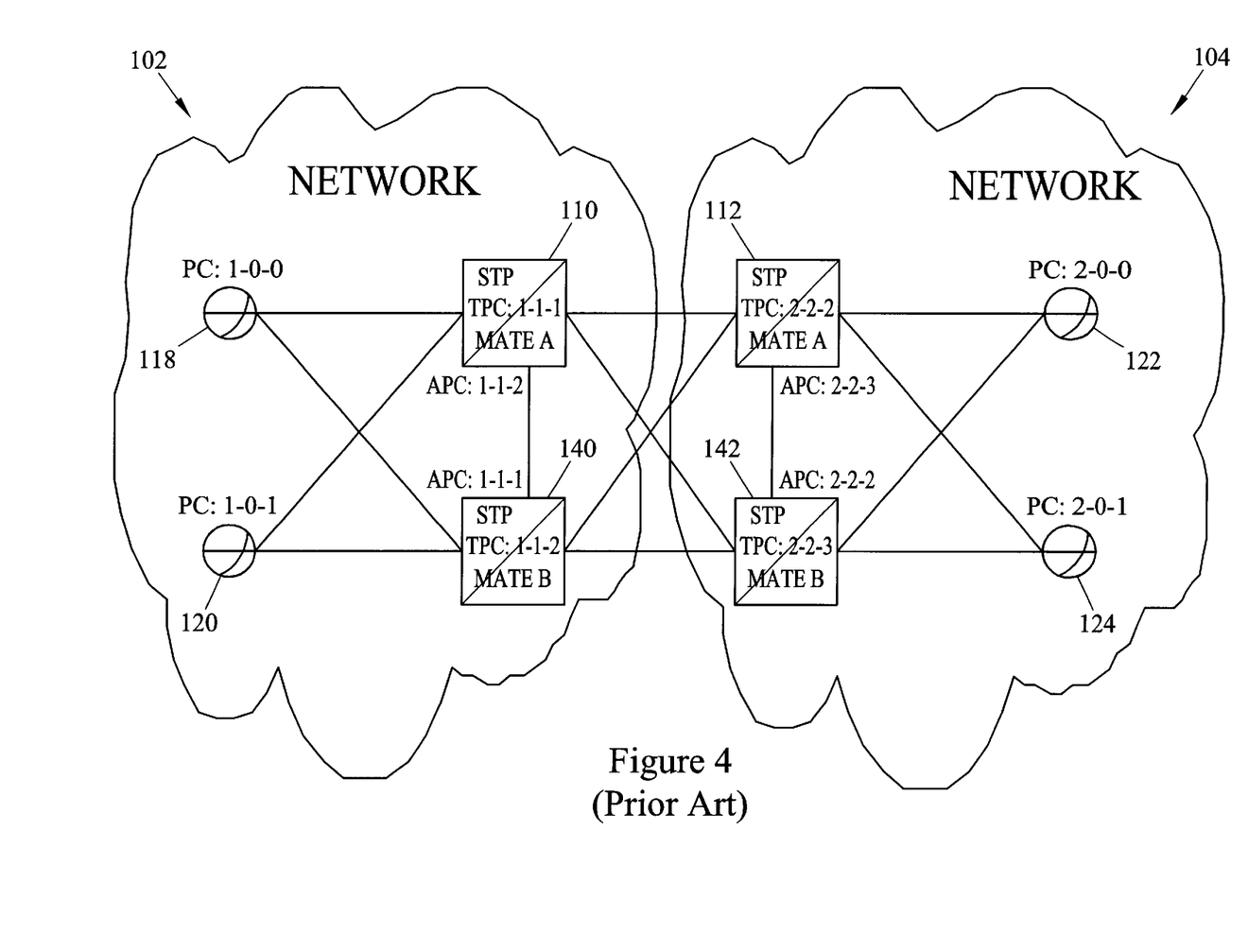
FIG. 4 is a network diagram illustrating a conventional signaling network environment including multiple mated STP pairs.

FIG. 4 illustrates in detail a portion of the signaling network environment presented in FIG. 1. More particularly, FIG. 4 illustrates networks 102 and 104. Mate STPs have been additionally depicted within both the network 102 and network 104. As such, STP 110 in network 102 is coupled to a mate STP 140, while STP 112 in network 104 is coupled to a mate STP 142. In the illustrated example, network 102 SPs 118 and 120 are assigned signaling system 7 point codes of 1-0-0 and 1-0-1, respectively. Similarly, SPs 122 and 124 in network 104 are assigned SS7 point code of 2-0-0 and 2-0-1, respectively. Network 102 mated STPs 110 and 140 are assigned unique, true point code values of 1-1-1 and 1-1-2, respectively. Network 104 mated STPs 112 and 142 are assigned unique TPC values of 2-2-2 and 2-2-3, respectively.

With particular regard to the TPC assignments of the mated STPs in network 102, those skilled in the art of STP design and operation will appreciate that STP 110 considers the TPC of STP 140 (i.e., 1-1-2) as the adjacent point code (APC) of it's mate. Similarly, STP 140 considers the TPC of STP 110 (i.e., 1-1-1) as the adjacent point code of it's mate. Within network 104, similar APC considerations between the mated STP pair 112 and 142 apply. That is, STP 112 considers the TPC of STP 142 (i.e., 2-2-3) as the adjacent point code of it's mate, and STP 142 considers the TPC of STP 112 (i.e., 2-2-2) as the adjacent point code of it's mate. Thus, it is apparent from FIG. 4 that each STP in a conventional SS7 network can have only one true point code and can recognize only one adjacent point code.

With further regard to the issue of adjacent point codes, SPs in a network that are directly coupled to an STP also consider the TPC of that STP to be an adjacent point code. As such, an SP may be adapted or "programmed" to communicate network management messages directly to the TPC of an adjacent STP. Further still, within a large signaling network (larger than the sample network presented in FIG. 4), there may be other SPs which are not directly coupled to a particular STP but which regularly communicate with the STP by addressing signaling messages to the unique TPC associated with the STP.

If the network operator(s) of the networks 102 and 104 wish to consolidate or minimize their STP routing infrastructure by eliminating one of the mated pairs of STPs and re-connect the orphaned SPs to the remaining STP pair, all of the orphaned SPs connected to the eliminated STP pair would need to be re-provisioned or re-assigned to the TPC of the remaining STP pair. In a large signaling network, such re-provisioning efforts can be significant and expensive.

Figure 5:
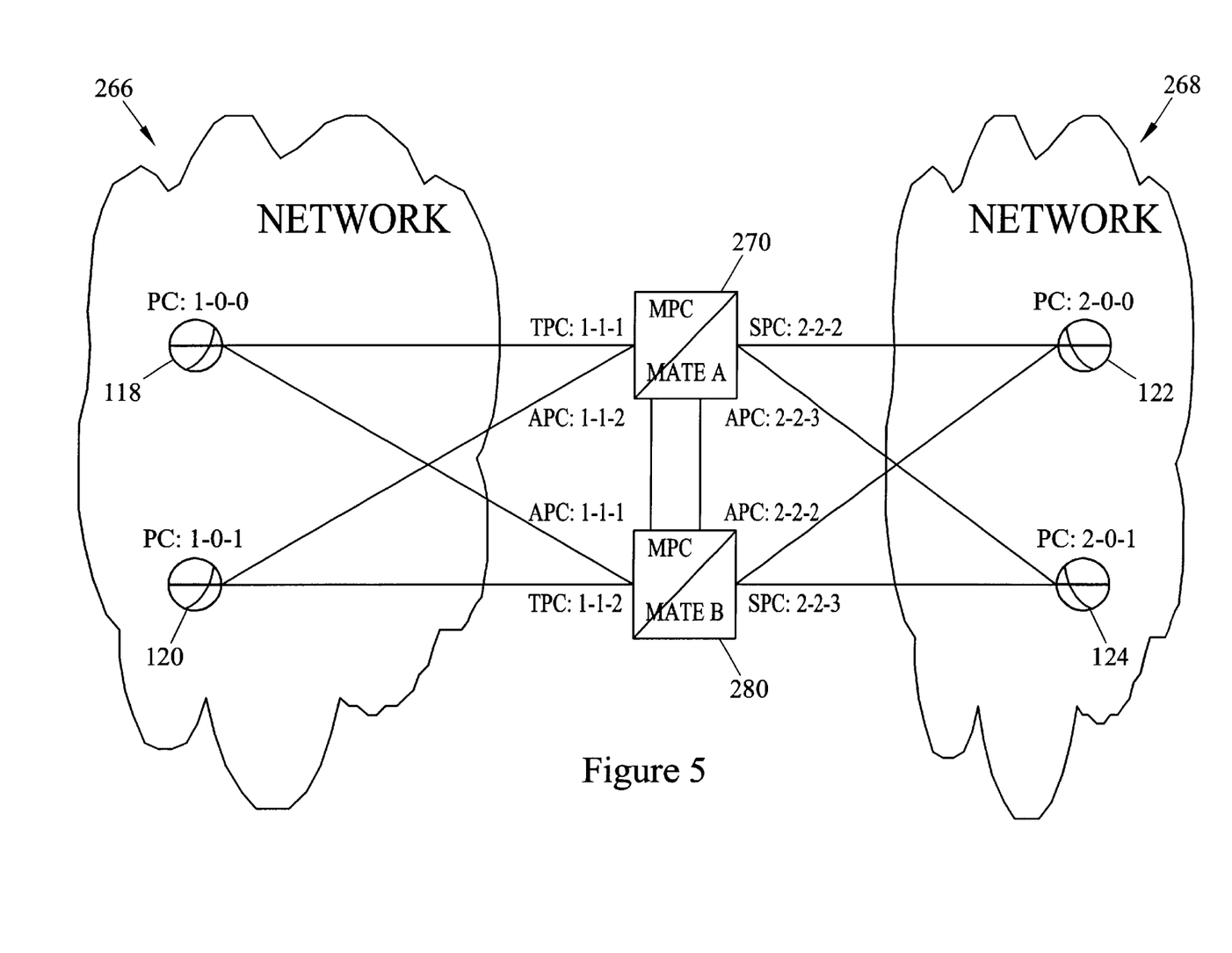
FIG. 5 is a network diagram illustrating a collapsed version of the signaling network environment shown in FIG. 4 using MPC routing nodes according to an embodiment of the present invention.

FIG. 5 illustrates a variation of the network environment presented in FIG. 4, wherein the STP routing infrastructure has been collapsed from 2 pairs of STPs to one pair of MPC routing nodes according to an embodiment of the present invention. More particularly, in FIG. 5, the mated STP pair in network 102 (i.e., STPs 110 and 140) and the mated STP pair in network 104 (i.e., STPs 112 and 142) have been removed and replaced with a mated pair of MPC routing nodes 270 and 280. In the illustrated embodiment, an MPC routing node 270 has been assigned a true point code of 1-1-1, which is the same TPC formerly assigned to STP 110. MPC routing node 270 has also been assigned an additional secondary true point code or secondary point code of 2-2-2, which is the same TPC formerly assigned to STP 112. Similarly, MPC routing node 280 has been assigned a true point code of 1-1-2, which is the same TPC formerly assigned to STP 140. MPC routing node 280 has also been assigned an additional secondary true point code or secondary point code of 2-2-3, which is the same TPC address formerly assigned to STP 142.

In FIG. 5, MPC routing nodes 270 and 280 recognize multiple adjacent point codes for their respective mates. More particularly, MPC routing node 270 recognizes 1-1-2 as the adjacent point code for one linkset and 2-2-3 as an adjacent point code of MPC routing node 270 on another linkset. Similarly, MPC routing node 280 recognizes 1-1-1 as the adjacent point code on one linkset and 2-2-2 as the adjacent point code of MPC routing node 270 on another linkset. Because MPC routing nodes 270 and 280 each recognize multiple adjacent point codes for their respective mates, the number of logical or physical signaling links between MPC routing nodes 270 and 280 can be increased. As a result, the reliability of MPC routing nodes 270 and 280 can be increased.

According to an important aspect of the invention, MPC routing nodes 270 and 280 treat their respective secondary point codes the same as their respective true point codes. That is, MPC routing nodes 270 and 280 originate network management messages from their secondary true point codes and terminate and process messages addressed to their secondary point codes in the same manner as messages addressed to their true point codes. As a result, SPs 118 and 120 in network 102 are still connected to an STP-like routing node that uses a point code of 1-1-1 to originate network management messages to SPs 118 and 120 and to receive and process network management messages from SPs 118 and 120. As such, no re-provisioning of either SP 118 or 120 is required to transition from the network architecture shown in FIG. 4 to the collapsed routing infrastructure architecture shown in FIG. 5. Similarly, SPs 122 and 124 in network 104 are still connected to a routing node that uses a point code of 2-2-2 to originate network management messages to SPs 122 and 124 and receive and process network management messages from SPs 122 and 124. Again, this is the case because MPC routing node 270 supports and is identified by a secondary true point code value of 2-2-2. Because MPC routing nodes 270 and 280 respond to and originate network management messages addressed to the true point codes of the replaced STPs, no re-provisioning of either SP 122 or 124 is required to transition from the network architecture shown in FIG. 4 to the collapsed routing infrastructure architecture shown in FIG. 5.

The present invention is not limited to a multiple point code routing node that supports only two true point codes. For example, if a multiple point code routing node replaces three STPs, then the MPC routing support may terminate three true point codes. Any number of true point codes may be supported by a multiple point code routing node of the present invention.

Multiple Point Code Routing Node Architecture

Figure 6:
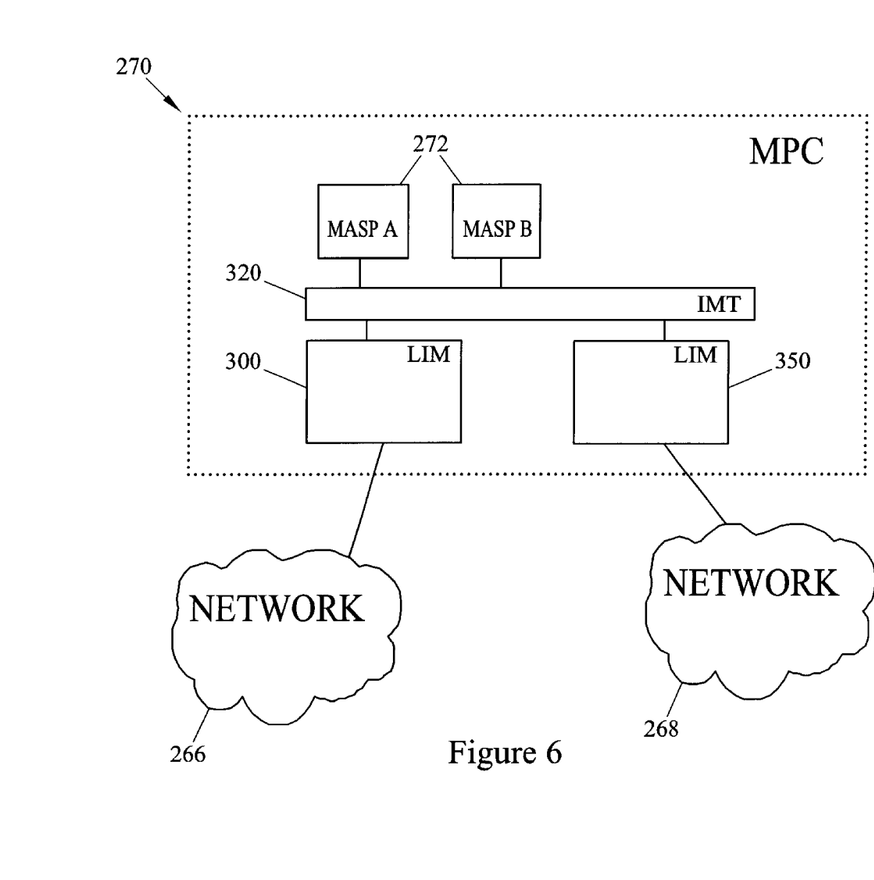
FIG. 6 is a block diagram of a multiple point code routing node according to an embodiment of the present invention.

FIG. 6 is a block diagram illustrating an exemplary internal architecture for a multiple point code routing node according to an embodiment of the present invention. In FIG. 6, MPC routing node 270 is coupled to a first SS7 signaling network 266 and to a second SS7 signaling network 268. The ability to connect a routing node to multiple networks without reconfiguring the networks is one of the features and advantages of the present invention.

MPC routing node 270 illustrated in FIG. 6 includes a high-speed interprocessor message transport communications bus 320. A number of distributed processing modules or cards are coupled to IMT bus 320 including: a pair of maintenance and administration subsystem processors (MASPs) 272; a first SS7-capable link Interface module 300; and a second SS7-capable link Interface module 350. These modules are physically connected to the IMT bus 320 such that signaling and other type messages may be routed internally between all active cards or modules. For simplicity of illustration, only a single pair of LIM processors 300 and 350 are included in FIG. 6. However, the present invention is not limited to a routing node having two link interface modules. The distributed, multi-processor architecture of the MPC routing node 270 may include multiple LIM and other processing and communication cards, all of which may be simultaneously connected to and communicating via IMT bus 320.

From a hardware perspective, LIMs 300 and 350 may each comprise a printed circuit board physically connected to IMT bus 320. Each printed circuit board may include a communication processor programmed to send and receive messages via IMT bus 320. Each printed circuit board may also include an application processor programmed to perform various functions. For example, the application processor of LIM 350 may be programmed to perform the functions described herein for sending and receiving SS7 network management messages using multiple true point codes.

MASP pair 272 implement the maintenance and administration subsystem functions described above. As MASP pair 272 are not particularly relevant to a discussion of the flexible routing attributes of the present invention, a detailed discussion of their function is not provided herein.

SS7 Link Interface Module Architecture

Figure 7:
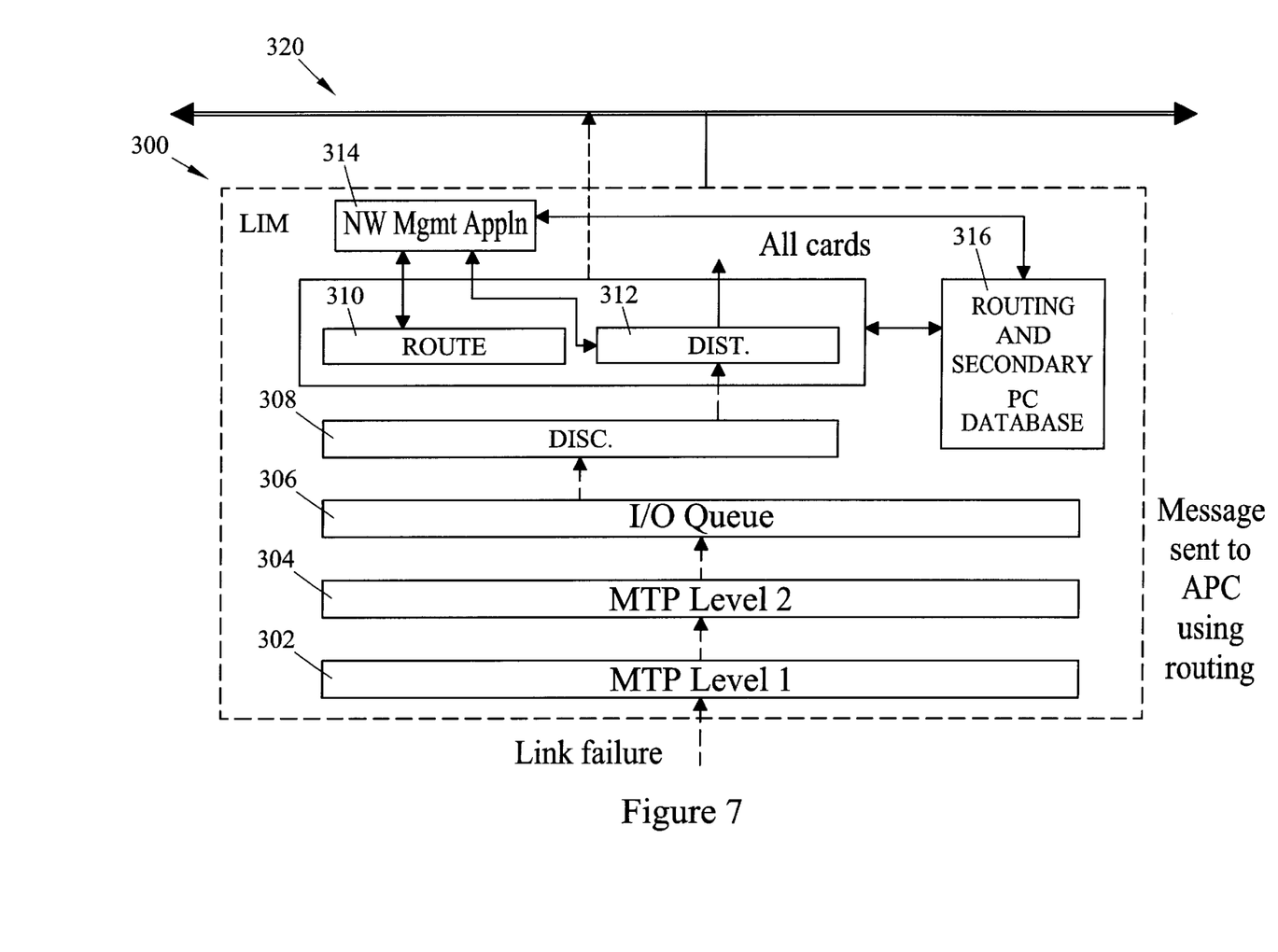
FIG. 7 is a block diagram of an SS7 link interface module (LIM) illustrating message flow associated with the receipt of a signaling message by an MPC routing node according to an embodiment of the present invention.

Referring to FIG. 7 and focusing now on LIM card functionality, LIM 300 is comprised of a number of applications including: an SS7 message transfer part (MTP) level 1 application 302; an SS7 message transfer part (MTP) level 2 application 304; an I/O buffer or queue 306; a discrimination application 308; a routing application 310; a distribution application 312, and a network management application 314. MTP level 1 application 302 provides the facilities necessary to send and receive digital data over a particular physical medium, such as a DS0 communication link or an optical communication link, such as an OC-n signaling link. Working in conjunction with the MTP level 1 application 302, MTP level 2 application 304 performs error detection, error correction, and sequenced delivery of SS7 message packets. I/O queue 306 provides temporary buffing of incoming and outgoing SS7 message packets. Discrimination application 308 receives signaling messages from the lower processing layers and performs a discrimination function, effectively determining whether an incoming SS7 message packet requires internal processing or is simply to be through-switched.

According to an important aspect of the invention, discrimination application 308 is configured to recognize multiple true point codes as point codes of MPC routing node 270 and to recognize multiple adjacent point codes of a mated MPC routing node, such as MPC routing node 280 illustrated in FIG. 5. Thus, in the example illustrated in FIG. 5, discrimination application 308 of MPC routing node 270 may be configured to recognize true point codes of 1-1-1 and 2-2-2. Discrimination application 308 may also be configured to recognize adjacent point codes of 1-1-2 and 2-2-3. Because discrimination application 308 recognizes these point codes as true and adjacent point codes, discrimination application 308 will identify received messages having these point codes as requiring further processing by MPC routing node 270 or adjacent MPC routing node 280.

Routing application 310 routes messages received from discrimination application 308 that do not require further processing at the MPC routing node and are simply to be through-switched. Distribution application 312 performs the internal routing of SS7 message packets received from discrimination application 308 that require additional by MPC routing node 270 processing prior to final routing. Routing application 310 may utilize data stored in a routing and secondary point code database 316 to route and distribute received messages. Since routing application 310 receives messages from discrimination application 308 that are not addressed to one of the true point codes recognized by MPC routing node 300, routing application 310 utilizes the data stored in database 316 to determine the appropriate outbound card or processing module within multiple point code routing node 270 to direct these messages. In one embodiment, database 316 includes an SS7 routing table and a linkset table. The routing and linkset tables contain signaling route and signaling route status information, along with internal IMT bus routing information.

Table 1 shown below illustrates an exemplary data structure and associated data for the routing table.

TABLE 1

Routing Data

DATA FIELDS

| KEY DPC | Route Cost | Linkset Status | Adjacent Status | Overall Status | Linkset Name | Secondary Point Code |
|---|---|---|---|---|---|---|
| 1-0-0 | 10 | A | A | A | LS1 | 1-1-1 |
| 1-0-0 | 20 | P | A | P | LS2 | 1-1-1 |
| 1-0-1 | 10 | A | A | A | LS3 | 1-1-1 |
| 1-0-1 | 20 | A | P | P | LS4 | 1-1-1 |
| 1-1-2 | 10 | A | A | A | LS5 | 1-1-1 |
| 1-1-2 | 20 | A | A | A | LS6 | 1-1-1 |
| 2-0-0 | 10 | A | A | A | LS7 | 2-2-2 |
| 2-0-0 | 20 | A | A | A | LS8 | 2-2-2 |
| 2-0-1 | 10 | A | A | A | LS9 | 2-2-2 |
| 2-0-1 | 20 | A | A | A | LS10 | 2-2-2 |
| 2-2-3 | 10 | A | A | A | LS11 | 2-2-2 |
| 2-2-3 | 20 | A | A | A | LS12 | 2-2-2 |

In Table 1, the routing data includes a destination point code key field, which may be used to index the table. DPC key fields, each corresponding to a different signaling protocol point code addressing scheme, may also be employed in an alternate embodiment of the present invention. For example, one DPC key field signaling protocol may be used to accommodate an American National Standards Institute (ANSI) point code format. Another DPC key field may be included in Table 1 for International Telecommunications Union-international (ITU-I) point code format. Yet another DPC field may be included in Table 1 for ITU-national (ITU-N) point code format. ITU national and international signaling protocols utilize a 14 bit point codes, while the ANSI signaling protocol employs a 24 bit point codes. However, for simplicity of illustration, only an ANSI-formatted DPC values are shown in the routing table.

In addition to the DPC field, Table 1 includes a route cost field, a linkset status field, an adjacent node status field, an overall status field, a linkset identifier or pointer field, and a secondary point code field. The route cost field includes a value that indicates the relative cost associated with the route. The linkset status field includes an identifier or value that indicates the status of the signaling link associated with the particular DPC value. The adjacent status field stores values or identifiers that indicate whether or not the linkset associated with an adjacent node is available. The overall status field stores values that indicate whether or not a linkset or an adjacent linkset is available. The linkset name field stores an identifier or value of the linkset associated with a particular destination point code.

According to an important aspect of the invention, the secondary point code field in Table 1 stores secondary point codes that are placed in the originating point code field of network management messages originated by the multiple point code routing node. For example, the multiple point code routing node may replace an STP in a signaling network, and the replaced STP may have had a true point code of 1-1-1. The multiple point code routing node will assume the secondary point code of 1-1-1 and treat that point code as its true point code when it receives a network management message addressed to 1-1-1. When the multiple point code routing node is communicating with a signaling point configured to communicate with the replaced STP, the multiple point code routing node will use the value 1-1-1 in the originating point code field for messages that the multiple point code routing node originates. Because the multiple point code routing node according to an embodiment of the present invention is capable of assuming multiple secondary point codes and using those point codes in messages that it originates, using a multiple point code routing node to replace one or more signal transfer points in a network can occur seamlessly.

Table 2 shown below illustrates exemplary linkset data that may be used by an MPC routing node according to an embodiment of the present invention.

TABLE 2

| KEY(s) | | DATA FIELDS | | | |
|---|---|---|---|---|---|
| Linkset Name | Link | IMT/Card Address | Port | Link Status | Adjacent Point Code |
| LS1 | 0 | 1305 | A | A | 1-0-0 |
| LS1 | 1 | 1307 | B | U | 1-0-0 |
| LS2 | 1 | 1505 | B | A | 1-0-0 |
| LS2 | 2 | 2300 | A | A | 1-0-0 |
| LS5 | 0 | 3301 | A | A | 1-1-2 |

TABLE 2-continued

| KEY(s) | | DATA FIELDS | | | |
|---|---|---|---|---|---|
| Linkset Name | Link | IMT/Card Address | Port | Link Status | Adjacent Point Code |
| LS5 | 1 | 3312 | B | A | 1-1-2 |
| LS11 | 0 | 1105 | A | A | 2-2-3 |
| LS11 | 1 | 1205 | A | A | 2-2-3 |
| A2B | 0 | 1401 | A | A | 1-1-2 |

Table 2 may be accessed using a compound key including a linkset identifier and a signaling link. Table 2 includes IMT bus address and port fields that store IMT bus address and communication port information associated with communication modules that are connected to IMT bus 320. More particularly, a record in the linkset table includes an IMT address and communication port value associated with a communication module that supports the specific link identified in the record key. For example, as shown in Table 2, link 0 of linkset 1 resides on a communication module that has an IMT bus address of 1305 and a communication port address of "A." Furthermore a link status field indicates that link 0 of linkset 1 is available for service. Table 2 also includes an adjacent point code field that contains information that identifies the signaling node that is connected at the distant end of a signaling link.

The SS7 routing table (Table 1) returns an index value or pointer used in a second database lookup the linkset table (Table 2). The ultimate result of this two-stage lookup procedure is an IMT bus address and communications port associated with a signaling link on a communication module. The present invention is not limited to the data structures illustrated in Tables 1 and 2 for routing received messages. Any data structure that takes a destination point code maps the point code to a linkset and a signaling link may be used. In addition, LIM 300 illustrated in FIG. 7 may include applications and databases other than those shown. The functionality illustrated in FIG. 7 is merely intended to illustrate the components of LIM 300 that may be used to perform multiple point code routing and distribution according to embodiments of the present invention.

LIM 300 may also include a secondary adjacent point code table used by network management application 314 to originate network management messages on IP links that interconnect mated multiple point code routing nodes. As used herein, the term "secondary adjacent point code" refers to a point code associated with a signaling node at the distant end of an IP linkset. Table 3 shown below illustrates exemplary secondary adjacent point code information that may be used for originating network management messages.

TABLE 3

| Secondary Adjacent Point Code Data | |
|---|---|
| Linkset Name | SAPC |
| A2B | 2-2-3 |

In Table 3, entries for a single linkset, A2B, are shown. However, it is understood that Table 3 may include entries for multiple linksets in an actual implementation. The use of each of the fields in Table 3 will now be described with reference to a network management example. Referring to FIG. 5, A2B may be associated with a link between MPG routing node 270 and SP 122. When a signaling link between MPG routing node 270 and SP 122 fails, MPG routing node 270 needs to inform its mate as well as other nodes connected to MPG routing node 270. Accordingly, network management application 314 of MPG routing node 270 generates a network management message. Network management application 314 may perform a lookup in Table 1 to determine the OPO to include in the network management message. In this example, the GPG is 2-0-0. Accordingly, network management application 314 performs a lookup in the DPG/GPG field in Table 1 to locate an entry corresponding to the GPG. In Table 1, the SPG that matches the GPG of 2-0-0 is 2-2-2. Accordingly, network management application 314 inserts 2-2-2 in the OPG field of the network management message. Referring to FIG. 4, the point code 2-2-2 corresponds to STP 112, which was replaced by MPG routing node 270 illustrated in FIG. 5. Since STP 112 is in the same network as SP 2-0-0, MPG routing node 270 preferably uses the true point code of STP 112 in the GPO field of network management messages that STP 112 would have originated.

In order to determine the correct DPC to use in the network management message to be sent to its mate, network management application 314 of MPC routing node 270 first performs a lookup in Table 2 for the adjacent point code to insert in the DPC field using the linkset name A2B, which corresponds to the linkset between MPC routing nodes 270 and 280. In Table 2, the adjacent point code corresponding to linkset A2B is 1-1-2. Next, MPC routing node 270 determines whether the selected APC value of 1-1-2 corresponds to the OPC of 2-2-2. This can be accomplished by performing a lookup in Table 1 using the APC of 1-1-2 as the search key. In this example, it can be seen that the secondary point code corresponding to 1-1-2 is 1-1-1, which is different from the OPC of 2-2-2. Accordingly, network management application 314 does not use 1-1-2 in the DPC field of the message. Instead, network management application 314 performs a lookup in Table 3 using the linkset name A2B as a search key. From Table 3, the SAPC corresponding to linkset A2B is 2-2-3. Network management application 314 must then determine whether this SAPC value matches the OPC selected for the message. This may be accomplished by performing a lookup in Table 1. From Table 1, it can be seen that the secondary point code corresponding to 2-2-3 is 2-2-2, which matches the OPC selected for the message. Accordingly, network management application 314 inserts the DPC of 2-2-3 in the message and routes the message to mate MPC routing node 280.

Thus, from this example, it can be seen that an MPC routing node according to an embodiment of the present invention is capable of selecting the correct true or secondary true point code to insert in the OPC field of a network management message. The MPC routing node is also capable of selecting the correct APC or SAPC corresponding to true or secondary true point code selected for the DPC field of the network management message. As a result, an MPC routing node according to embodiments of the present invention can originate network management messages to a mate MPC routing node when the mate MPC routing node replaces multiple STPs.

Multiple Point Code Routing

In routing a message, when LIM 300 receives a message, the message is processed by MTP level 1 application 302 and MTP level 2 application 304 and stored in I/O queue 306. Discrimination application 308 then analyzes the destination point code field in the message to determine whether the message is addressed to the true point code of the routing node that houses LIM 300 or to one of the secondary true point codes associated with the multiple point code routing node that houses LIM 300. This is fundamentally different from prior art discrimination applications, which only recognized a single true point code.

If discrimination application 308 determines that the received message is addressed to one of the true point codes or the secondary point codes of the multiple point code routing node, discrimination application 308 passes the message to distribution application 312. Distribution application 312 analyzes destination point code field in the received message and determines the appropriate address of the processing module within the multiple point code routing node for processing the received message. For network management messages that affect routing tables, discrimination application 312 may distribute the messages to all intended processing modules whose routing tables could be affected. The network management application associated with each card or processing module would then update the associated routing table. Because distribution application 312 is configured to internally route messages addressed to any of the multiple true point codes of routing node 270, the functionality of distribution application is different from prior art distribution applications, which only recognize a single true point code.

If discrimination application 308 determines that a received message is not addressed to one of the true point codes of the multiple point code routing node, discrimination application passes the message to routing application 310. Routing application 310 uses the data stored in routing and secondary point code database 314 to route the message to the card associated with the appropriate external signaling link. Because LIM 300 is provisioned to recognize multiple point codes as true point codes of an MPC routing node, the MPC routing node can replace multiple nodes existing in a communications network without requiring modification of the other network node.

Secondary-Point-Code-Based Network Management Example

Figure 8:
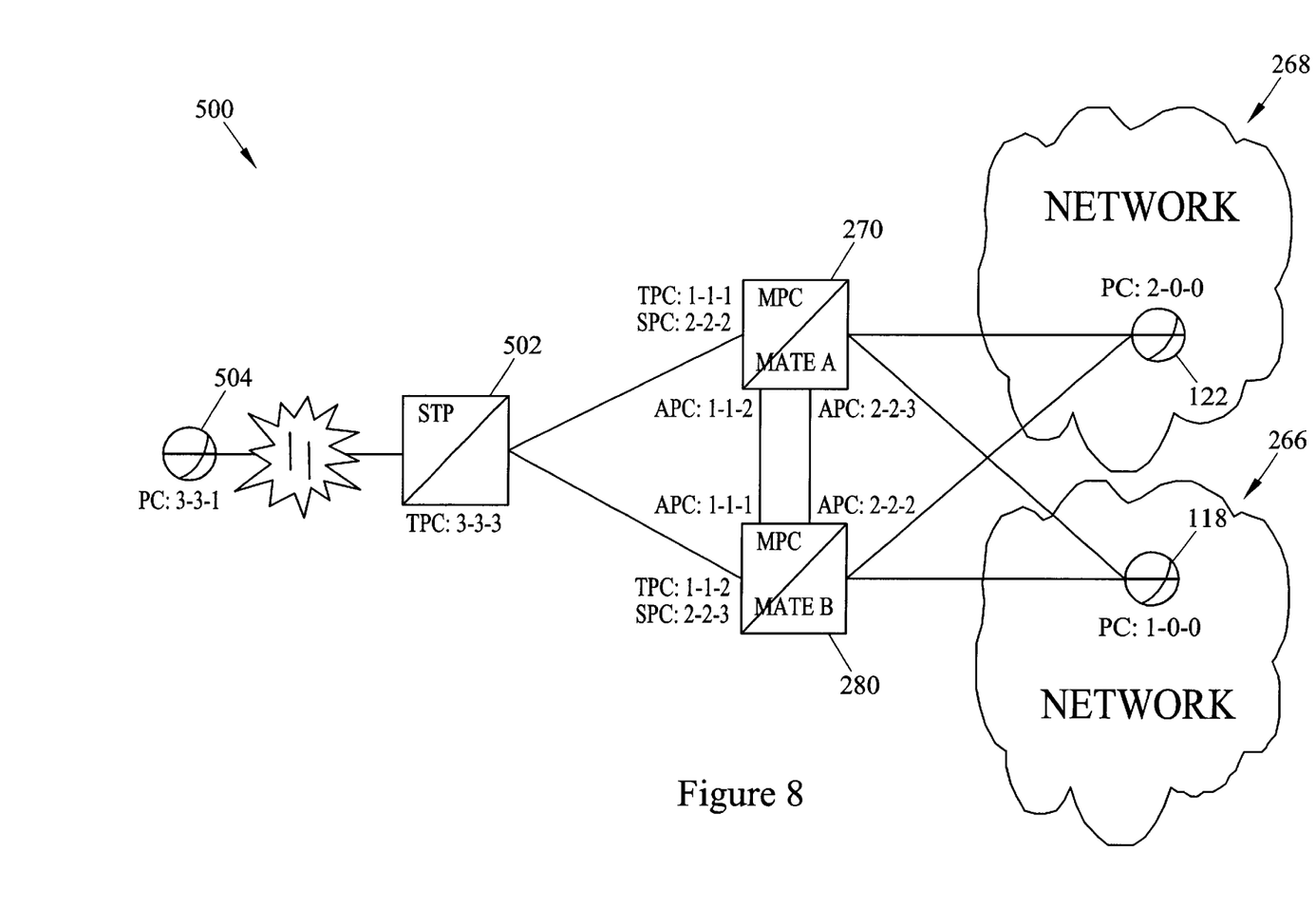
FIG. 8 is a network diagram illustrating the network management functionality of an MPC routing node according to an embodiment of the present invention.

FIG. 8 illustrates an exemplary communications network that will be used to demonstrate the operation of MPC routing nodes in performing network management according to embodiments of the present invention. In FIG. 8, a network 500 includes a portion of networks 266 and 268 mated MPC routing nodes 270 and 280. Network 500 also includes an STP 502 and an SP 504. STP 502 is assigned a true point code of 3-3-3, and SP 504 is assigned a true point code of 3-3-1. SPs within network 266 communicate with the MPC routing nodes 270 and 280 using the true point code values of 1-1-1 and 1-1-2, respectively. Likewise, SPs network 268 communicate with MPC routing nodes 270 and 280 using the true point code values of 2-2-2 and 2-2-3, respectively. In this example, STP 502 and SP 504 communicate with MPC routing nodes 270 and 280 using the true point code values of 1-1-1 and 1-1-2, respectively.

Figure 9:
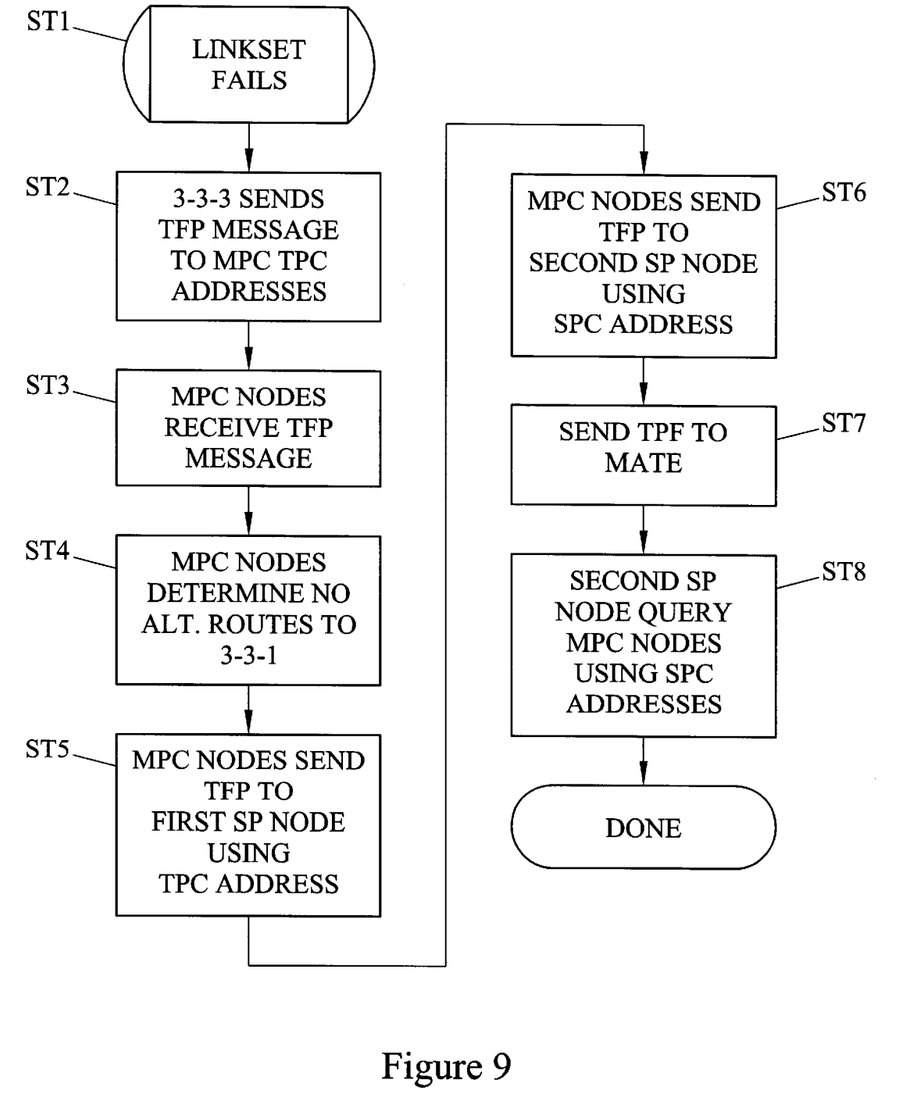
FIG. 9 is a flow chart illustrating exemplary network management message generation steps performed by the multiple point code routing node illustrated in FIG. 8.

The operating scenario shown in FIG. 8 corresponds to a linkset failure that isolates SP 504 (i.e., PC: 3-3-1). FIG. 9 is a flow chart illustrating MPC routing node functionality associated with signaling link failure according to an embodiment of the present invention. Beginning with step ST1, the only linkset connecting SP 504 to STP 502 fails or is taken out of service. As such, STP 502 is no longer able to communicate with SP 504, and STP 502 generates an SS7 MTP level 3 network management message, referred to as a transfer prohibited (TFP) message (ST2). The TFP message generated by STP 502 includes routing label information that specifies an originating point code value of 3-3-3 (i.e., the true point code of STP 502), a destination point code (DPC) value of 1-1-1 (i.e., the true point code of MPC routing node 270), and a concerned point code (CPC) value of 3-3-1 (i.e., the point code of the isolated SP 504).

In step ST3, the TFP message is received by MPC routing node 270. The routing and secondary point code database is subsequently accessed to determine whether other routes are available to deliver signaling message traffic to the concerned point code of isolated SP 504. In this particular example, there are no alternate routes that MPC routing node 270 may utilize to re-route signaling message traffic around the failed linkset (ST4). As indicated in the example network architecture shown in FIG. 8, the only path from MPC routing node 270 to SP 504 is via STP 502 and the failed signaling link. In this example, the same lack of alternate routes is true for mate MPC routing node 280.

Given the determination that no alternate routes exist from either MPC routing node 270 or 280 to isolated SP 504, MPC routing node 270 generates a second TFP message that includes routing label information that specifies an originating point code value of 1-1-1 (i.e., the true point code of MPC routing node 270), a destination point code value of 1-0-0 (i.e., the point code of SP 118), and a concerned point code value of 3-3-1 (i.e., the point code of isolated SP 504), as indicated in step ST5. MPC routing node 270 also generates a third TFP message which includes routing label information that specifies an originating point code value of 2-2-2 (i.e., the secondary true point code of MPC routing node 270), a destination point code value of 2-0-0 (i.e., the point code of SP 122), and a concerned point code value of 3-3-1 (i.e., the point code of isolated SP 504), as indicated in step ST6. In step ST7, MPC routing node 270 generates and sends another TFP message to mated MPC routing node 280. This TFP message includes an OPC value of 1-1-2 and a DPC value of 1-1-1. The values for the OPC and DPC fields in the various network management messages may be selected as described above based on the STP(s) being replaced by the MPC routing node.

Upon receiving the TFP messages from MPC routing node 270 or 280, SPs 118 and 122 subsequently mark SP 504 as prohibited and consequently do not attempt to send any messages to the isolated SP (i.e., PC: 3-3-1). SPs 118 and 122 periodically generate and transmit routeset test prohibited network management messages that query for the availability status of the isolated SP 504. In the case of SP 122, an RSP message is generated and sent to MPC routing node 270. The RSP message includes routing label information that specifies an originating point code value of 2-0-0 (i.e., the point code of SP 122), a destination point code value of 2-2-2 (i.e., the secondary true point code of MPC routing node 270), and a concerned point code value of 3-3-1 (i.e., the point code of isolated SP 504), as indicated in step ST8. When SP 118 generates and sends an RSP message to MPC routing node 270, the RSP message includes a destination point code value of 1-1-1 (i.e., the true point code of MPC routing node 270). Both SPs 118 and 122 will continue to periodically poll the MPC routing nodes until one or both of the MPC routing nodes responds with a transfer allowed network management message. The TFA message sent to SP 118 by MPC routing node 270 will include an OPC value of 1-1-1 (i.e., the true point code of MPC routing node 270), while the TFA message sent to SP 122 by MPC routing node 270 will include an OPC value of 2-2-2 (i.e., the secondary true point code of MPC routing node 270).

Because the MPC routing node according to embodiments of the present invention is capable of inserting different true point code values in the originating and destination point code fields of network management messages that it originates, the multiple point code routing node is able to seamlessly replace the network management functionality of multiple STPs. For example, in the scenario described with respect to FIGS. 8 and 9, MPC routing node 270 uses its true point code of 1-1-1 when originating network management messages directed to signaling points in network 268. MPC routing node 270 used its secondary true point code of 2-2-2 in originating network management messages directed to nodes in network 266. Similarly, MPC routing node 280 utilizes its true point code of 1-1-2 when originating network management messages to be sent to network 266. MPC routing node 280 utilizes its secondary true point code of 2-2-3 when originating network management messages destined for network 268. Thus, MPC routing nodes 270 and 280 can seamlessly replace the network management functionality of two mated pairs of STPs or signaling gateways previously configured to communicate with LATA A and LATA B networks 266 and 268.

Multiple C Linkset Capability

In the example illustrated in FIG. 8, MPC routing node 270 is configured to recognize 1-1-2 as the adjacent point code of MPC routing node 280 on linkset 1. MPC routing node 270 is also configured to recognize 2-2-3 as the adjacent point code of MPC routing node 280 on linkset 2. Similarly, MPC routing node 280 is configured to recognize 1-1-1 as the adjacent point code of MPC routing node 270 on linkset 3. MPC routing node 280 is also configured to recognize 2-2-2 as the adjacent point code of MPC routing node 270 on linkset 4. Because MPC routing nodes 270 and 280 can each recognize multiple adjacent point codes for their mate multiple point code routing node, the MPC routing nodes according to embodiments of the present invention allow multiple C linksets to be used in interconnecting MPC routing nodes. For example, an additional C linkset can be used for each additional adjacent point code. Utilizing additional C linksets between mated multiple point code routing nodes increases the reliability of a telecommunications system.

In an alternate embodiment, rather than provisioning multiple SS7 G linksets for the multiple adjacent point codes, a network operator may connect MPG routing nodes 270 and 280 with a single IP link and use adjacent point codes and secondary adjacent point codes to implement multiple logical G linksets within the IP link. In the example illustrative in FIG. 8, the multiple C linksets between MPC routing nodes 270 and 280 may be replaced by a single IP signaling link. MPC routing node 270 may recognize 1-2-2 as the APC and 2-3-3 as the secondary APC on the IP linkset. Similarly, MPG routing node 280 may recognize 1-1-1 as the APC and 2-2-2 as the secondary APC on the IP linkset.

Thus, the present invention includes a multiple point code routing node that originates and processes messages using multiple true point codes. The multiple point code routing node can thus replace multiple STPs that located in different networks without reconfiguring all of the nodes in the network. Because a single node (or mated pair) can seamlessly and efficiently replace multiple STPs, telecommunications networks can be upgraded and reliability can be increased.

It will be appreciated that various details of the invention may be changed without departing from the scope of the invention. Furthermore, the foregoing description is for the purpose of illustration only, and not for the purpose of limitation—the invention being defined by the claims.

What is claimed is:

1. A method for reducing the number of signal transfer points in a signaling network without re-configuring network elements configured to communicate with the signal transfer points, the method comprising:

(a) connecting a first multiple point code routing node to a first network configured to communicate with a first signal transfer point having a first true point code;

(b) connecting the first multiple point code routing node to a second network configured to communicate with a second signal transfer point having a second true point code;

(c) configuring the first multiple point code routing node to terminate, process, and originate messages having the first true point code; and (d) configuring the first multiple point code routing node to terminate, process, and originate messages having the second true point code.

2. The method of claim 1 wherein connecting the first multiple point code routing node to the first and second networks includes replacing the first and second signal transfer points.

3. The method of claim 1 wherein configuring the first multiple point code routing node to terminate process, and originate messages having the first and second true point codes includes configuring the multiple point code routing node to terminate process, and originate network management messages having the first and second true point codes.

4. The method of claim 1 comprising:

(a) connecting a second multiple point code routing node to the first network, wherein the first network is configured to communicate with the second signal transfer point having a third true point code;

(b) connecting the second multiple point code routing node to the second network, wherein the second network is configured to communicate with a third signal transfer point having a fourth true point code;

(c) configuring the second multiple point code routing node to terminate, process, and originate messages having the third true point code; and (d) configuring the second multiple point code routing node to terminate, process, and originate messages having the fourth true point code.

5. The method of claim 4 wherein connecting the second multiple point code routing node to the first and second networks includes replacing the second and third signal transfer points.

6. The method of claim 4 wherein configuring the second multiple point code routing node to terminate, process, and originate messages having the second and third true point codes includes configuring the multiple point code routing node to terminate, process, and originate network management messages having the second and third true point codes.

7. The method of claim 4 comprising configuring the first multiple point code routing node to recognize the third and fourth true point codes as adjacent point codes and configuring the second multiple point code routing node to recognize the first and second true point codes as adjacent point codes.

8. The method of claim 7 wherein configuring the first multiple point code routing node to recognize the third and fourth point codes as adjacent point codes includes configuring the first multiple point code to select a routable adjacent point code when originating a network management message to the second multiple point code routing node.

9. The method of claim 1 wherein configuring the first multiple point code routing node to originate messages includes configuring the multiple point code routing node to select proper values for OPC and DPC fields in the messages.

10. The method of claim 1 wherein steps (c) and (d) include configuring first multiple point code routing node to selectively insert any one of the first and second true point codes in originating point code fields of outbound messages based on destinations for the outbound messages.

11. A method for originating network management messages using a multiple point code routing node for replacing multiple STPs, the method comprising:

at a multiple point code routing node:

(a) detecting a first network management event;

(b) in response to detecting the first network management event formulating a first network management message;

(c) inserting a true point code of the multiple point code routing node in an originating point code field of the first network management message, the true point code corresponding to a point code of a replaced routing node;

(d) sending the first network management message to a node in a first communications network;

(e) formulating a second network management message;

(f) inserting a secondary true point code of the multiple point code routing node in an originating point code field of the second network management message, the secondary true point code corresponding to a point code of a second replaced routing node; and, (g) forwarding the second network management message to a node in second communications network.

12. The method of claim 11 wherein the first and second network management messages comprise transfer prohibited messages.

13. The method of claim 11 wherein detecting a first network management event comprises detecting failure of a signaling link.

14. The method of claim 13 comprising:

(a) detecting recovery of the signaling link;

(b) formulating a first transfer allowed message;

(c) inserting the true point code of the multiple point routing node in an originating point code field of the transfer allowed message; and (d) forwarding the first transfer allowed message to the node in the first communications network.

15. The method of claim 14 comprising:

(a) formulating a second transfer allowed message;

(b) inserting the secondary true point code of the multiple point code routing node in an originating point code field of the second transfer allowed message; and (c) forwarding the second transfer allowed message to the node in second communications network.

16. The method of claim 11 comprising:

(a) identifying a concerned point code associated with the network event;

(b) determining a secondary adjacent point code associated with the same network as the concerned point code; and (c) inserting the secondary adjacent point code in a destination point code field of the first network management message.

17. The method of claim 11 wherein inserting a true point code of the multiple point code routing node of the first network management message includes selecting any one of a plurality of true point codes based on the replaced routing node.

18. A link interface module for allowing a multiple point code routing node to replace multiple signal transfer points in multiple networks, the link interface module comprising:

(a) a discrimination application configured to recognize a plurality of point codes as true point codes of a network routing node;

(b) a distribution application for distributing messages received from the discrimination application that are addressed to any of true point codes of the network routing node;

(c) a network management application for originating network management messages using the true point codes of the network routing node; and (d) a routing application for routing messages received from the discrimination application that are not addressed to one of the true point codes of the network routing node.

19. The link interface module of claim 18 wherein the network management application is adapted to select one of the true point codes as an OPC when originating network management messages for a replaced signal transfer point, wherein the selected true point code corresponds to the true point code of the replaced signal transfer point.

20. The link interface module of claim 19 wherein the network management application is adapted to select a DPC value when originating a network management message to a mate network routing node replacing multiple STPs, the destination point code (DPC) value corresponding to a true point code of an STP replaced by the mate network routing node.

21. The link interface module of claim 18 wherein the network management application is adapted to determine correct originating point code (OPO) and destination point code (DPC) values when originating network management messages on behalf of a replaced signal transfer point.

22. A multiple point code routing node for replacing multiple STPs comprising:

(a) a discrimination application configured to recognize a plurality of point codes corresponding to a plurality of replaced routing nodes as true point codes;

(b) a distribution application for distributing messages received from the discrimination application that are addressed to any of true point codes;

(c) a network management application for originating network management messages using the true point codes; and (d) a routing application for routing messages received from the discrimination application that are not addressed to one of the true point codes.

23. The multiple point code routing node of claim 22 wherein the network management application is adapted to determine the correct originating point code (OPC) and destination point code (DPC) values to include in network management messages that it originates based on an STP or STPs replaced by the multiple point code routing node.

24. The multiple point code routing node of claim 22 wherein the network management application is adapted to selectively insert one of multiple true point codes in an originating point code field of each network management message originated by the multiple point code routing node based on a destination for each network management message.

25. A telecommunications system comprising:

(a) a first multiple point code routing node for replacing multiple STPs and being configured to originate, terminate, and process network management messages addressed to any of a plurality of true point codes in first set of true point codes corresponding to replaced routing nodes;

(b) a second multiple point code routing node functioning as a mate to the first multiple point code routing node for replacing multiple STPs and being configured to originate, terminate, and process network management messages addressed to any of a plurality of true point codes in a second set of true point codes corresponding to replaced routing nodes; and (c) a plurality of linksets interconnecting the first and second multiple point code routing nodes, wherein the first and second multiple point code routing nodes each associate a plurality of point codes with the plurality of linksets.

26. The system of claim 25 wherein the linksets comprise SS7 linksets, and wherein the first and second multiple point code routing nodes each associate a plurality of adjacent point codes with the plurality of linksets.

27. The system of claim 25 wherein the linksets comprise an IP signaling link divided into multiple logical linksets using an adjacent point code and at least one secondary adjacent point code.

28. The system of claim 25 wherein the first multiple point code routing node is adapted to select, based on a concerned point code, between the true point codes in the first set to include in an originating point code (OPC) field in a network management message to be sent to the second multiple point code routing node and to select, based on the true point code selected for the OPO field, a true point code in the second set to include in the destination point code (DPC) field of the network management message.

29. The system of claim 25 wherein the first and second multiple code routing nodes are adapted to selectively insert any one of the true point codes in the first and second sets of true point codes in originating point code fields of outbound network management messages based on destinations for the outbound network management messages.

30. A telecommunications system comprising:

(a) a first multiple point code routing node for replacing multiple STPs and having a first set of true point codes that the first multiple point code routing node uses to identify itself;

(b) a second multiple point code routing node for replacing multiple STPs and having a second set of true point codes that the second multiple point code routing node uses to identify itself; and (c) a high-speed signaling link connecting the first and second multiple point code routing nodes, the high-speed signaling link being divided into multiple logical linksets based on the first and second sets of true point codes.

31. The system of claim 30 wherein the first multiple point code routing node is adapted to select, based on a concerned point code, between the true point codes in the first set to include in an originating point code (OPC) field in a network management message to be sent to the second multiple point code routing node and to select, based on the true point code selected for the OPC field, a true point code in the second set to include in the destination point code (DPC) field of the network management message.

32. The telecommunications system of claim 30 wherein the first and second multiple code routing nodes are adapted to selectively insert any one of the true point codes in the first and second sets of true point codes in originating point code fields of outbound network management messages based on destinations for the outbound network management messages.

* * * * *